Nov. 19, 1963 H. G. LE CLAIR 3,111,424
PROCESS OF COATING IRRADIATED POLYMER SUBSTRATES
Filed July 8, 1955
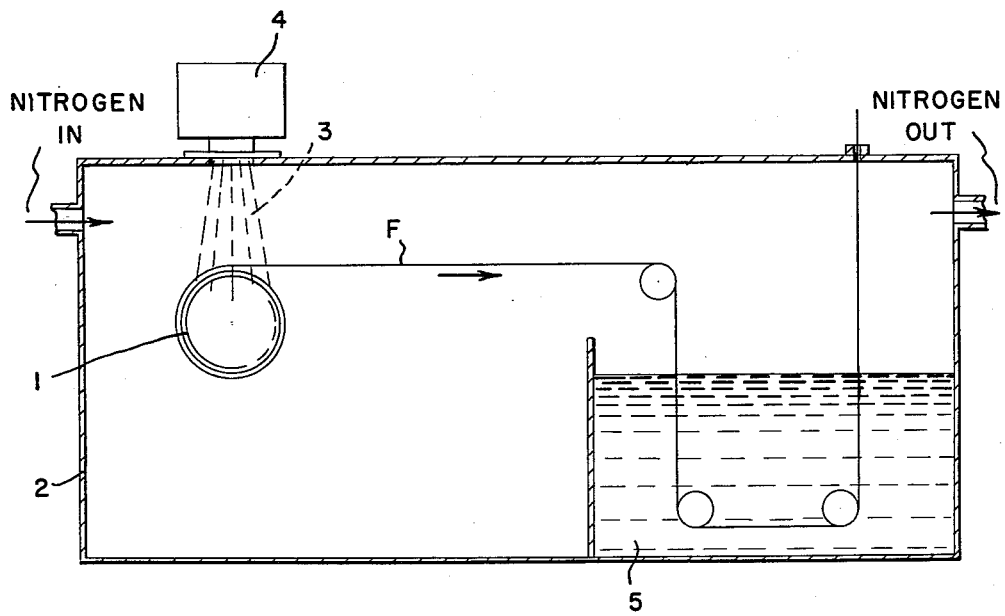
INVENTOR
HUGH GRENVILLE LE CLAIR
BY
ATTORNEY United States Patent Office 3,111,424
Patented Nov. 19, 1963

3,111,424
PROCESS OF COATING IRRADIATED
POLYMER SUBSTRATES
Hugh Grenville Le Clair, Grand Island, N.Y., assignor to
E. I. du Pont de Nemours and Company, Wilmington,
Del., a corporation of Delaware
Filed July 8, 1955, Ser. No. 520,649
13 Claims. (Cl. 117—47)

This invention relates to a process of adhering polymeric coatings to polymeric substrates, and more particularly, to a process of adhering polymeric coatings to thermoplastic polymeric films.

The general effects of high energy particle irradiation upon high molecular weight polymers are known. Since high polymers are covalent substances, the effect of radiation is largely caused by ionization and electronic excitation. These processes cause instantaneous flow of electric current and the breakage and rearrangement of chemical bonds, and the formation of free radicals. In the case of many high polymers, irradiation initiates chemical reactions which may include gas liberation, double-bond formation and elimination, degradation, polymerization, cross-linking and vulcanization, vitrification, hydrogenation, and others. Effecting one or more of such phenomena tends to bring about important changes in the physical properties of the high molecular weight polymeric material. The extent to which such changes in physical properties are useful depends upon the particular material being treated, the conditions of treatment, and the intended end use for the irradiated product.

A summary of the effects of high energy particle irradiation upon high molecular weight polymers appears in Modern Plastics, September 1954, 141–238, in an article titled "Effects of Atomic Radiation on High Polymers," by K. H. Sun. This article also includes an extensive bibliography of references pertinent to the subject.

It is also known that high energy particle irradiation may be employed to effect polymerization of monomeric materials which polymerize to form polymers by the recurring addition of the monomer units, i.e., the formula of the monomer is identical to that of the structural unit of the polymer (cf. British Patent 665,262 issued to A. A. Brasch). These monomers are those with ethylenic or diene unsaturation. Furthermore, it is known that high energy particle irradiation may be employed to effect condensation of various materials to form polymers wherein the molecular formula of the monomers differs from that of the structural unit. In many condensation processes chemical union of the polymer molecules takes place with the elimination of simpler molecules (e.g., $H_2O$, HCl, NaCl, $NH_3$ or the like). On the other hand, condensation polymers may be prepared from certain monomeric derivatives whereby the elimination of such simple molecules is not required. This is because the simple molecule has already in effect been eliminated from the monomer.

An object of the present invention is to provide a process of adhering a coating of a polymer formed from an ethylenically unsaturated compound upon the surface of a formed substrate of a high molecular weight polymeric material. A further object is to form high molecular weight polymeric films having an adherent coating of a chemically dissimilar polymer formed from an ethylenically unsaturated compound. Other objects will be apparent from the following description of the invention.

The above objects are accomplished in accordance with the present invention, which, briefly stated, comprises irradiating shaped, polymeric substrate, e.g., polymeric film, with high energy particle irradiation and substantially immediately thereafter contacting the surface of said irradiated substrate with an ethylenically unsaturated monomer, to effect polymerization and bonding thereof to the substrate surface.

From a theoretical approach it is believed that the present process results in actual chemical bonding between the polymeric substrate and its polymeric coating which in the preferred embodiment of the invention differs chemically from the substrate. In view of the fact that irradiation of polymeric materials tends to effect the formation of free radicals, it is believed that free radicals are formed upon the surface of the irradiated polymeric substrate, and that these free radicals serve as polymerization initiators whereby polymeric chains are grown and expanded to form a high molecular weight polymeric coating which is chemically bonded to its substrate. Examples to be presented hereinafter contain substantial evidence that an actual chemical bonding between the coating and substrate is effected by the process of the present invention. Regardless of theories, however, it should be understood and emphasized that this process serves to effect a highly tenacious polymeric coating, particularly upon a substantially chemically dissimilar polymeric substrate, and the coating cannot be removed by chemical extraction techniques or by flexing the coated substrate in an attempt to flake off or physically strip the coating from its substrate.

As employed herein, the term "shaped polymeric substrate" refers to films, filaments, fabrics woven from formed filaments, sheets, rods, tubes, particles of any geometric configuration, etc. For purposes of illustration, however, the present process will be hereinafter described with specific reference to treatment of film as the preferred shape of substrate. The shaped substrate may be formed from a thermoplastic or thermosetting type polymeric compound which has been formed by addition polymerization or by condensation. Addition polymers are those formed by the recurring addition of a monomeric unit, and the formula of the monomer is identical with that of the unit structural formula of the polymer. Polymers formed by addition polymerization may usually be subjected to thermal or photochemical degradation to yield the monomer unit. Typical addition polymers or copolymers may be formed from the following monomers having ethylenic or diene unsaturation: alkyl acrylates and methacrylates such as methyl methacrylate, ethyl acrylate, etc., acrylic and methacrylic acid, ethylene and its derivatives such as the halosulfonated ethylenes and tetrafluoroethylene, vinyl chloride, vinyl acetate, vinylidene chloride, styrene, acrylonitrile, and methacrylonitrile, butadiene, etc. Polymers and copolymers formed from the aforementioned monomeric materials may be substantially thermoplastic or they may be thermosetting as a result of their having been cross-linked or vulcanized. For example, the polymer may be a rubbery vulcanized material formed from butadiene, butadiene and styrene, chloroprene, butadiene/acrylonitrile, etc. It is preferred that the chemical composition of the substrate differ from that of the coating formed thereon.

The shaped polymeric substrate may also be formed from condensation polymers, which polymers usually have a unit molecular structural formula differing from the molecular formula of the monomer. During chemical union of monomer molecules in condensation reactions simpler molecules are eliminated, such as $H_2O$, HCl, NaCl, $NH_3$ and the like. Normally, the monomer can be obtained from condensation polymers by hydrolysis. It should also be apparent that some condensation polymers may be prepared from certain monomeric derivatives whereby the elimination of simple molecules is not required because the simple molecule has already in effect been eliminated from the monomer. Examples of such monomeric compounds are acid anhydride, lactones and lactams. More specifically, a polyamide can be prepared from an amino carboxylic acid with the evolution of water molecules. On the other hand, the identical polymer can be prepared from the epsilon lactam derivative of that amino carboxylic acid, but in this case no water need be eliminated. Similarly, alkyd resins can be prepared by reacting glycerine and phthalic acid with the elimination of water molecules, or by reacting glycerine with phthalic anhydride with the elimination of a smaller amount of water. Examples of organic condensation polymers which may be formed into shaped substrates for treatment in accordance with the present invention include the polyesters and polyamides (U.S. Patents 2,071,- 250, -251 and -253), and more particularly, polyesters such as polyethylene terephthalate (U.S. Patent 2,130,- 948 and 2,241,322). Other condensation polymers, including both thermoplastic and thermosetting polymers include polyaminotriazoles, polyethers, polyureas, polyurethanes, phenolalkyds, urea-aldehydes, malamine resins, silicones, etc.

High energy particle irradiation, which is employed in carrying out the present invention may be from positive ions, for example, protons, deuterons or alpha particles, from neutrons or from electrons. The charged particles may be accelerated to high speed by means of a suitable voltage gradient using such devices as a resonant cavity accelerator, a Van de Graaff generator, a betatron, a synchrotron, a cyclotron or the like. Neutron irradiation may be produced by bombardment of selected light metal, e.g. beryllium, targets with high energy positive particles. In addition, particle radiation suitable for use in the present process may be obtained from an atomic pile, or from radioactive isotopes. In carrying out the present process, it is important to control the amount of radiation to which any web material is exposed. The preferred dose for any particular web material depends essentially upon the chemical structure of the material and the intended end use for the irradiated product. In this description of the invention irradiation dosage may best be described in terms of reps. (roentgen equivalent physical) where a rep. is defined as that amount of high energy particle radiation (cathode rays, neutrons, or positive ions) which results in an energy absorption of 83.8 ergs per gram of water or equivalent absorbing medium.

As stated hereinbefore, it is believed that the irradiation step of the present process brings about the formation of free radicals upon the surface of the polymeric substrate, and it is believed that the number formed upon the substrate surface and the rate at which such free radicals are formed depend to a certain degree upon the chemical nature of the fluid medium surrounding the polymeric substrate during the irradiation treatment. The preferred fluid medium in which the polymeric substrate is irradiated is an inert gaseous atmosphere, such as nitrogen. With respect to the fluid medium or atmosphere in which the polymeric substrate is irradiated, it should be borne in mind that the fluid medium or atmosphere should not oxidize the substrate.

One of the salient features of the present invention is that extremely thin continuous or discontinuous polymeric coatings may be applied to a chemically dissimilar polymeric substrate. The thickness of any continuous or discontinuous coating may be regulated by controlling the amount of initial irradiation, the time the polymeric substrate is in contact with the polymerizable monomer, the density and chemical composition of the medium in which the polymeric substrate is irradiated, and the temperature at which polymerization is carried out. For example, it may be desirable to apply a polymeric size to a film, the size serving to improve film-to-film slip, prevent blocking or matting, increase the surface electrical properties of the film, and decrease the static accumulation on the film surface. Such coatings may be applied in non-continuous manner by masking the irradiation from certain areas of the film so that a very thin, discontinuous, but uniformly distributed, coating is adhered to the polymeric film substrate. Furthermore, discontinuous coatings may be applied by carrying out irradiation of a film surface under normal conditions, and thereafter immersing the irradiated film into a liquid polymerizable monomer for only a short duration. This may be followed by immersing the film in a solvent to wash and/or extract incompletely polymerized polymer and/or monomer from the film surface to give a thin, discontinuous coating which acts as a sizing.

Thicker coatings may be applied in accordance with the present invention by adding a further step of taking a substrate coated in accordance with the primary step described hereinbefore, and thereafter immersing this coated substrate in a polymerizable liquid from which the polymeric coating was formed and irradiating the coated substrate while it is immersed in a polymerizable monomer to effect polymerization and bonding of additional polymeric coating to the layer of coating already bonded. Since the coating is chemically identical to the polymer which will be formed from the monomer in which the film is being irradiated, bonding of additional polymer to the coating is facilitated; and a polymeric substrate having a substantially thicker coating is formed.

Any convenient technique of irradiating the surface of a polymeric substrate in a fluid atmosphere and thereafter contacting the irradiated surface with the ethylenically unsaturated monomer may be employed. A preferred technique for the treatment of film is to direct a beam of high energy particles from any suitable source, e.g., a Van de Graaff generator, onto the surface of the supply roll from which the film is being unwound as described and claimed in my copending patent application Serial No. 507,340, filed May 10, 1955, now abandoned.

Referring to the accompanying drawing wherein a preferred technique of treating continuous polymeric film employing the principles disclosed in my aforesaid copending application is diagrammatically illustrated. A supply roll 1 of continuous film F mounted on an enclosure 2 and maintained in an atmosphere of nitrogen, is subjected to bombardment by a stream 3 of high energy particles emitted from a suitable generator 4, the stream 3 being directed on the film in a transverse line coincident with the line at which the film leaves the roll 1. In this way, the high energy particle irradiation will penetrate into more than one layer of the film, thus utilizing the full effect of the stream of high energy particles. The irradiated film is then passed through a bath 5 of ethylenically unsaturated monomer, and after a suitable reaction period the film is collected on a wind-up roll (not shown).

The following examples will serve to further illustrate the principles and practice of the present invention:

*Example 1*

A polyethylene film in an atmosphere of nitrogen was irradiated with high energy electrons under the beam of a Van de Graaff generator to a dosage of 10 mrep. Substantially immediately thereafter, monomeric methyl methacrylate was poured into the container in which the film had been irradiated, and the monomer and film were permitted to contact for a period of 5 minutes. Thereafter, the film was removed and dried in air. A control sample of polyethylene film which had not been irradiated was also immersed in methyl methacrylate monomer for a period of 5 minutes, removed, and dried.

The coated film was subjected to an infrared analysis. The infrared spectrum for the film showed all of the characteristic absorption bands obtained with polymethyl methacrylate. The sample of film was then soaked in acetone at 30° C. for 3 hours (with stirring). It was estimated that about 15% of the weight of the polymethyl methacrylate coating was removed. At the end of this period the film was washed in fresh acetone and dried under vacuum overnight at 90° C. Re-examination of the infrared spectrum for the film still showed the characteristic absorption bands for polymethyl methacrylate. The control sample exhibited no evidence of polymethyl methacrylate.

*Example 2*

A polyethylene film was immersed in water at room temperature, and the film was irradiated with a high energy electron beam at a dosage of 10 mrep. Substantially immediately thereafter the irradiated film was dipped in methyl methacrylate monomer at room temperature for 5 minutes. The sample was subsequently dried and subjected to an infrared examination. The infrared examination showed the characteristic absorption bands for polymethyl methacrylate.

I claim:

1. A process which comprises irradiating shaped substrate of synthetic organic polymeric material selected from the group consisting of addition polymers and condensation polymers, with ionizing irradiation in an inert atmosphere, and substantially immediately thereafter contacting the surface of the irradiated substrate with an ethylenically unsaturated monomer whereby to form on said substrate a polymeric coating.

2. A process according to claim 1 wherein said monomer yields a polymeric coating chemically dissimilar to the substrate.

3. A process which comprises irradiating film of synthetic organic polymeric material selected from the group consisting of addition polymers and condensation polymers, with ionizing irradiation in an inert atmosphere, and substantially immediately thereafter contacting the surface of the irradiated film with an ethylenically unsaturated monomer whereby to form on said film surface a polymeric coating.

4. A process according to claim 3 wherein said monomer yields a polymeric coating chemically dissimilar to the substrate.

5. A process according to claim 4 wherein the film is a thermoplastic polymeric film.

6. A process which comprises irradiating film of synthetic organic polymeric material selected from the group consisting of addition polymers and condensation polymers with ionizing irradiation in an atmosphere of nitrogen and substantially immediately thereafter contacting the surface of the irradiated film with an ethylenically unsaturated monomer whereby to form on said film surface a polymeric coating.

7. A process according to claim 6 wherein said monomer yields a polymeric coating chemically dissimilar to the film.

8. A process which comprises irradiating continuous film of synthetic organic polymeric material selected from the group consisting of addition polymers and condensation polymers being continuously unwound from a supply roll of said film by directing a beam of ionizing irradiation on the surface of said roll in an inert atmosphere, and substantially immediately thereafter contacting the surface of the irradiated film with an ethylenically unsaturated monomer whereby to form on said film surface a polymeric coating.

9. A process according to claim 8 wherein said monomer yields a polymeric coating chemically dissimilar to the film.

10. A process which comprises irradiating film of synthetic organic polymeric material selected from the group consisting of addition polymers and condensation polymers with ionizing irradiation while said film is immersed in water and substantially immediately thereafter contacting the surface of the irradiated film with an ethylenically unsaturated monomer whereby to form on said film surface a polymeric coating.

11. A process which comprises irradiating shaped substrate of synthetic organic polymeric material selected from the group consisting of addition polymers and condensation polymers, with ionizing irradiation while said substrate is immersed in water and substantially immediately thereafter contacting the surace of the irradiated substrate with an ethylenically unsaturated monomer whereby to form on said surface a polymeric coating.

12. A process which comprises subjecting a shaped substrate of polymeric material to ionizing irradiation in an inert atmosphere, and thereafter contacting the surface of the irradiated substrate with an ethylenically unsaturated monomer whereby to form on said substrate a polymeric coating.

13. The graft polymer formed by contacting an ethylenically unsaturated monomer with a preformed polymeric organic substrate previously irradiated with ionizing radiation in an inert atmosphere.

References Cited in the file of this patent

UNITED STATES PATENTS 2,715,075    Wolinski _____ Aug. 9, 1955

FOREIGN PATENTS 511,718    Belgium _____ Nov. 28, 1952
665,262    Great Britain _____ Jan. 23, 1953

OTHER REFERENCES

"Modern Plastics," volume 32, No. 10, pages 159, 252, and 254.

"Modern Plastics," July 1955, pages 105, 106, 108, and 205.